United States Patent
Probin et al.

(10) Patent No.: US 9,575,476 B2
(45) Date of Patent: Feb. 21, 2017

(54) SYSTEM AND METHOD TO PROTECT AGAINST LOCAL CONTROL FAILURE USING CLOUD-HOSTED CONTROL SYSTEM BACK-UP PROCESSING

(75) Inventors: Robert John Probin, South Lanarkshire (GB); David S. Zakrewski, Babylon, NY (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 702 days.

(21) Appl. No.: 13/456,788

(22) Filed: Apr. 26, 2012

(65) Prior Publication Data
US 2013/0285799 A1  Oct. 31, 2013

(51) Int. Cl.
*G05B 11/01* (2006.01)
*G05B 15/02* (2006.01)

(52) U.S. Cl.
CPC .... *G05B 15/02* (2013.01); *G05B 2219/23043* (2013.01); *G05B 2219/25168* (2013.01)

(58) Field of Classification Search
CPC .......... G08B 13/1968; G08B 13/19684; G08B 125/10; G08B 29/02; G08B 29/00; G08B 25/002; G08B 29/046; G05B 9/03; G05B 15/02
USPC ..... 340/506, 527, 528, 531, 539.14, 539.16, 340/539.17; 700/84; 710/15, 67
See application file for complete search history.

(56) References Cited

U.S. PATENT DOCUMENTS 5,909,183 A * 6/1999 Borgstahl ............... G08C 19/28
340/10.51
6,725,106 B1 * 4/2004 Covington et al. ............ 700/82
2003/0100962 A1 * 5/2003 Sumita et al. .................. 700/65
2003/0140270 A1 * 7/2003 Lehmann ........... G05B 19/0421
714/4.1
2004/0102683 A1 * 5/2004 Khanuja ............... A61B 5/0002
600/300

(Continued)

FOREIGN PATENT DOCUMENTS

EP  1 959 409 A2  8/2008
EP  1 970 871 A2  9/2008
(Continued)

OTHER PUBLICATIONS

Combined Search and Examination Report for corresponding GB application GB1307374.7 dated Oct. 24, 2013.

*Primary Examiner* — Nabil Syed
(74) *Attorney, Agent, or Firm* — Husch Blackwell LLP

(57) ABSTRACT

Systems and methods that use cloud-hosted control system back-up processing to replace the functionality of a failed control panel are provided. Systems can include a remote monitoring station, a remote control panel device, and a local control system installed in a region, the local control system including a local control panel and at least one device. When operating in a normal mode, the at least one device can communicate with the local control panel, the local control panel can communicate with the remote monitoring station, and the remote control panel device can be inactive. When operating in a back-up mode, the remote control panel device can be active, the at least one device can communicate with the remote control panel device, the remote control panel device can communicate with the remote monitoring station, and the local control panel can be inactive.

16 Claims, 6 Drawing Sheets

A Control System, utilizing an on-site (local) communication device, operating in back-up fall-back mode

(56) References Cited

U.S. PATENT DOCUMENTS

| | | | | |
|---|---|---|---|---|
| 2007/0168058 A1* | 7/2007 | Kephart | ................... | G05B 9/03 |
| | | | | 700/82 |
| 2007/0290830 A1 | 12/2007 | Gurley | | |
| 2009/0322527 A1 | 12/2009 | Crisp et al. | | |
| 2010/0083356 A1* | 4/2010 | Steckley | ............. | H04L 12/2818 |
| | | | | 726/5 |
| 2010/0312881 A1* | 12/2010 | Davis et al. | .................. | 709/224 |

FOREIGN PATENT DOCUMENTS

| | | |
|---|---|---|
| EP | 2 114 055 A1 | 11/2009 |
| EP | 2 124 206 A1 | 11/2009 |
| WO | WO 95/16980 A1 | 6/1995 |
| WO | WO 2008/042215 A1 | 4/2008 |

* cited by examiner

A Control System, operating in back-up fall-back mode

A Control System, utilizing an on-site (local) communication device, operating normally A Control System, utilizing an on-site (local) communication device, operating in back-up fall-back mode

SYSTEM AND METHOD TO PROTECT AGAINST LOCAL CONTROL FAILURE USING CLOUD-HOSTED CONTROL SYSTEM BACK-UP PROCESSING

FIELD

The present invention relates generally to control systems. More particularly, the present invention relates to systems and methods to protect against local control failure using cloud-hosted control system back-up processing.

BACKGROUND

Known control systems can include, for example, alarm security systems, access control systems, fire control systems, and the like. These types of control systems are often dependent on a local control panel to operate. For example, when a control system is installed in a building, sensors and/or output devices can be installed throughout the building, and each of the sensors and/or output devices can communicate and rely on a control panel that is also located in the building.

Because of the dependent nature of known control systems, the hardware and/or software failure of the control panel is problematic. For example, failed hardware and/or software must be replaced before the control system can continue operation. But it is not always possible to replace the hardware or software in a timely manner.

There is thus a continuing, ongoing need for systems and methods to protect against the failure of local control panels.

DETAILED DESCRIPTION

Figure 1:
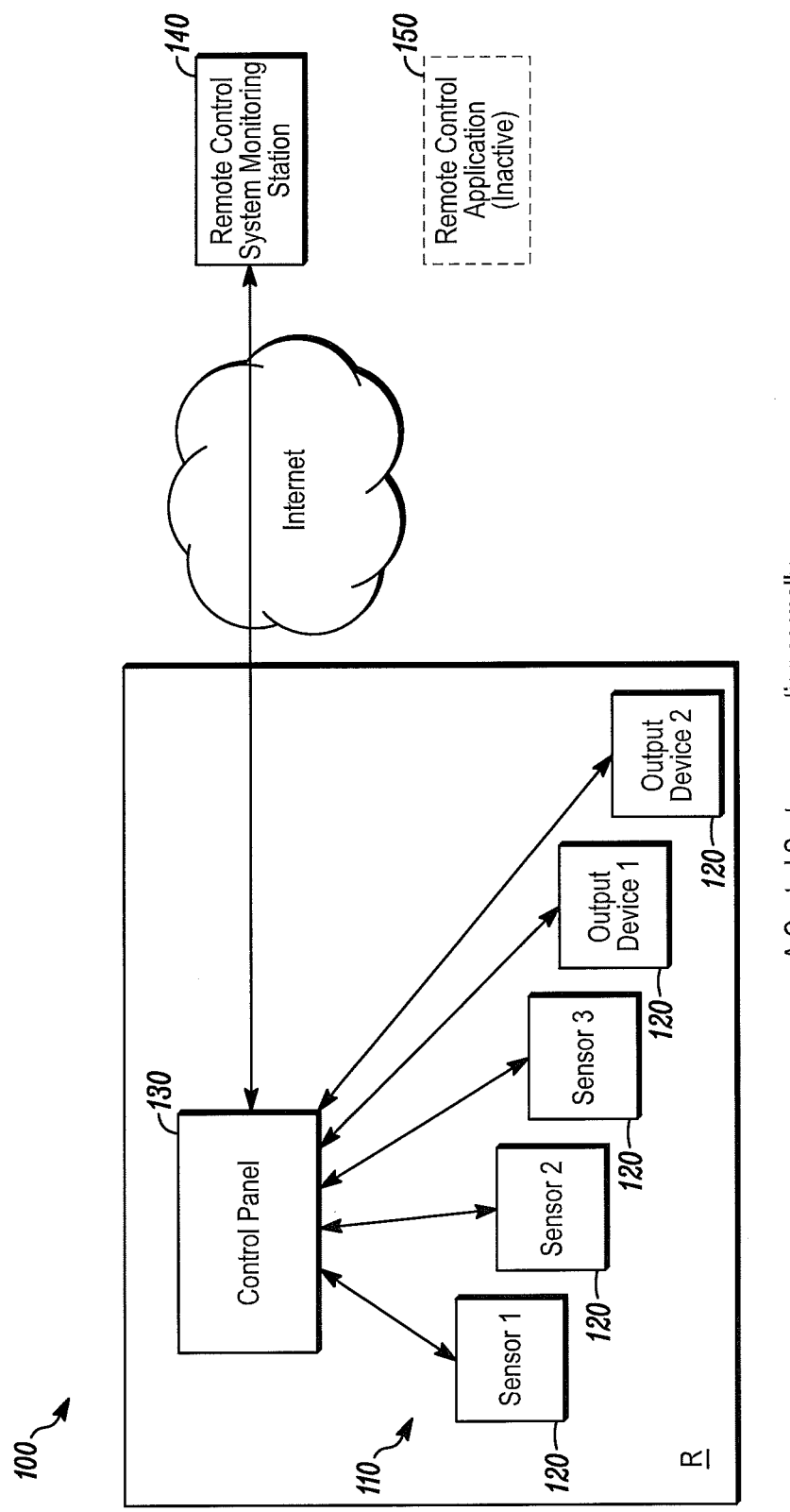
FIG. 1 is block diagram of a system in accordance with disclosed embodiments operating normally.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods to protect against the failure of local control panels. For example, systems and methods disclosed herein can use cloud-hosted control system back-up processing to replace the functionality of a failed control panel.

It is to be understood that systems and methods disclosed herein can be employed when the hardware and/or software of a local control panel fails in any way as would be known by those of skill in the art. For example, systems and methods can be employed when the control panel has an electrical failure, when tampering with the control panel occurs, when the control panel is compromised by an intruder, etc.

A control panel of a local control system can communicate with a remote control system monitoring station. For example, the control panel can send monitoring communication messages to the monitoring station. In accordance with disclosed embodiments, when hardware and/or software of the control panel fails, a cloud-hosted version of the control panel can remotely take control of the local control system and continue operating the local control system until the control panel is repaired. In some embodiments, the cloud-hosted version of the control panel can fully take over the capabilities of the local control panel or take over reduced capabilities of the local control panel.

It is to be understood that the cloud-hosted version of the control panel disclosed herein can include executable control software stored on a transitory or non-transitory computer readable medium, including, but not limited to, computer memory, RAM, optical storage media, magnetic storage media, flash memory, and the like. The cloud-hosted version of the control panel can remotely communicate with devices in the local control system, absent the local control panel.

In accordance with disclosed embodiments, the cloud-hosted version of the control panel can be inactive when the local control panel is fully functional. However, in some embodiments, the local control system, including the local control panel, can transmit periodic updates to the inactive cloud-hosted version of the control panel. In this manner, the inactive cloud-hosted version of the control panel can match the system configuration and status of the local control system. Then, when the local control panel fails, the cloud-hosted version of the control panel is already configured and updated and can begin active operation substantially immediately.

In known control systems, sensors and output devices need only communicate with the local control panel. However, in systems and methods disclosed herein, sensors and output devices can also wirelessly communicate with the cloud-hosted version of the control panel. For example, the sensors and output devices can be capable of connecting to and communicating via a wireless network, such as the Internet, a LAN, or a WAN. In some embodiments, the sensors and output devices can communicate with the Internet using any communication method as would be known by those of skill in the art, for example, 6LoWPAN, ZigBee, Bluetooth, Ethernet, or any other proprietary communication method.

In some embodiments disclosed herein, a local control system can include a communication device separate from the local control panel for communicating with a remote monitoring station. For example, a communication device can have access to a main control panel bus of the wired or wireless local communication system for the control system. In these embodiments, when the local control panel fails, the communication device can take over communication functionalities and act as a bridge between devices in the control system and the cloud-hosted version of the control panel.

In still further embodiments, a local control system can include more than one, for example, two communication devices. For example, a first communication device can include an on-board PSTN communication device, and a second communication device can include a separate Ethernet-enabled or GSM/GPRS communication device. Alternatively, both communication devices can be separate, off-board communication devices (e.g., Ethernet-enabled and GSM).

In some embodiments, the wired or wireless local communication system for the control system can also include a secondary communication bus. One or both of the main and secondary buses can be on the control panel PCB or off the control panel PCB, for example, on a separate multiplexer board. The buses can connect to both the control panel and any communication devices in the control system.

FIG. 1 is block diagram of a system 100 in accordance with disclosed embodiments operating normally. As seen in FIG. 1, the system 100 can include a local control system 110 installed in a region R. The local control system 110 can include a plurality of sensors and/or output devices 120 and a control panel 130. Each of the plurality of sensors and/or output devices 120 can be in wired or wireless bidirectional communication with the control panel 130, and the control panel 130 can be in wireless bidirectional communication with a remote control system monitoring station 140. For example, the control panel 130 can communicate with the remote monitoring station 140 via the Internet.

Monitoring communication messages can be transmitted between the control panel 130 and the remote monitoring station 130 at predetermined intervals to demonstrate a valid connection. In some embodiments, the monitoring communication messages between the control panel 130 and the remote monitoring station 140 can be periodic and/or include information related to the health of the control system 110. The rate at which the monitoring communication messages between the control panel 130 and the remote monitoring station 140 are transmitted can depend on communication architecture and national and international standard requirements for the control panel 130.

Figure 2:
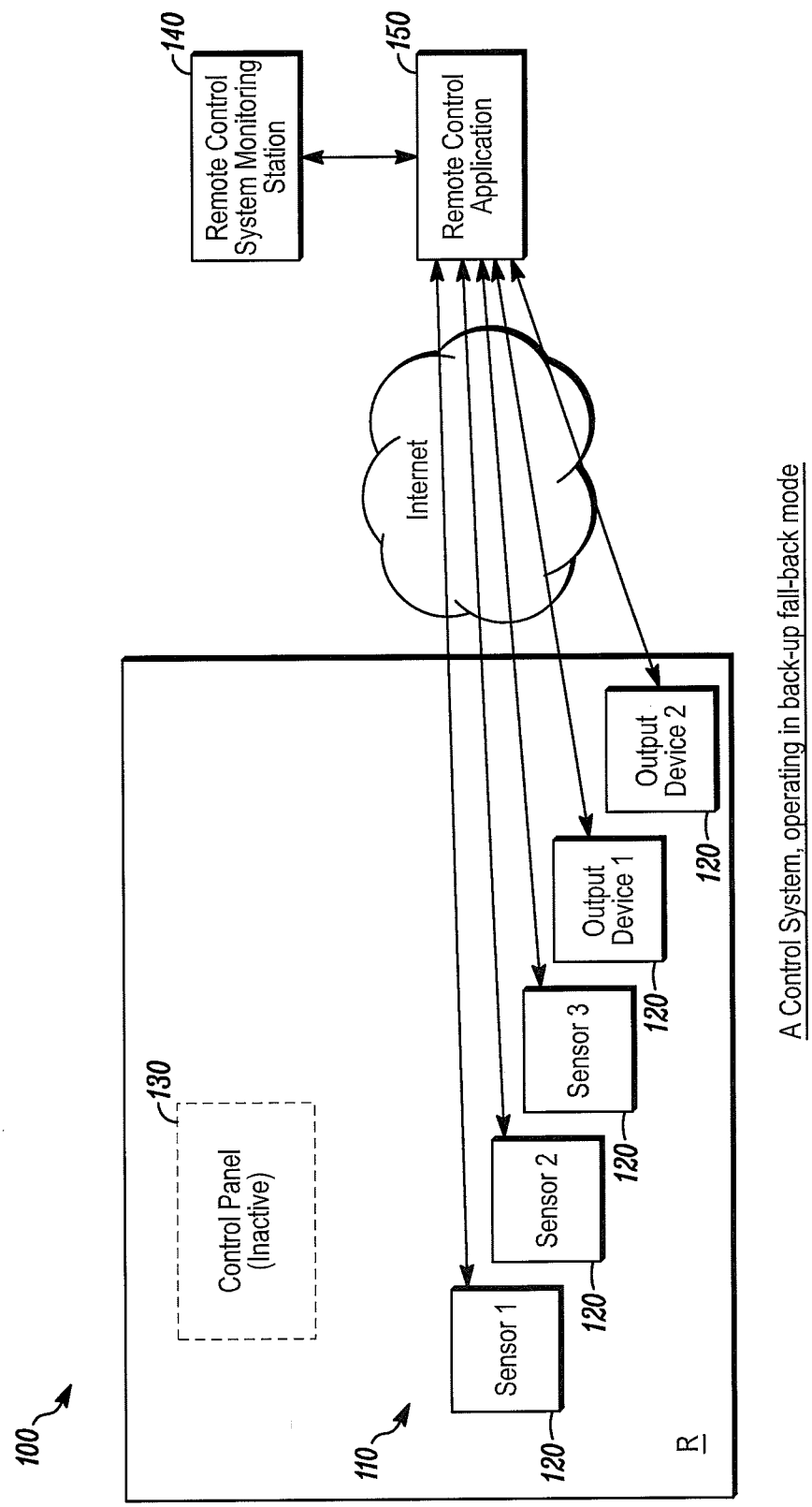
FIG. 2 is a block diagram of the system of FIG. 1 operating in a back-up mode.

As seen in FIG. 1, the system 100 can also include a remote control panel device 150. When the system is operating normally, as seen in FIG. 1, the remote control panel device 150 can be inactive. However, when software and/or hardware of the control panel 130 fails, the system 100 can operate in a back-up mode, as seen in FIG. 2.

When the system 100 is operating in a back-up mode, the control panel 130 can be inactive, and the remote control panel device 150 can be activated. The plurality of sensors and/or output devices 120 can then communicate directly with the remote control panel device 150, which can communicate with the remote monitoring station 140. For example, in some embodiments, the plurality of sensors and/or output devices 120 can communicate with the remote control panel device 150 via the Internet.

In some embodiments, when the system 100 begins operating in the back-up mode, each of the plurality of sensors and/or output devices 120 can initiate communication with the remote control panel device 150. These embodiments may occur when the plurality of sensors and/or output devices 120 is behind a firewall and thus, cannot be contacted from outside of the local control system 110 or when the plurality of sensors and/or output devices 120 is programmed, for security reasons, not to accept incoming connections.

In other embodiments, when the system 100 begins operating in the back-up mode, the remote control panel device 150 can initiate communication with each of the plurality of sensors and/or output devices 120. In these embodiments, the remote control panel device 150 can initiate communication with each of the plurality of sensors and/or output devices 120 when the remote control panel device 150 is notified of a system failure, that is, that the hardware and/or software of the control panel 130 has failed. For example, the remote monitoring station 140 can notify the remote control panel device 150 about a system failure, and, upon being notified, the remote control panel device 150 can activate and initiate contact with each of the plurality of sensors and/or output devices 120.

Figure 3:
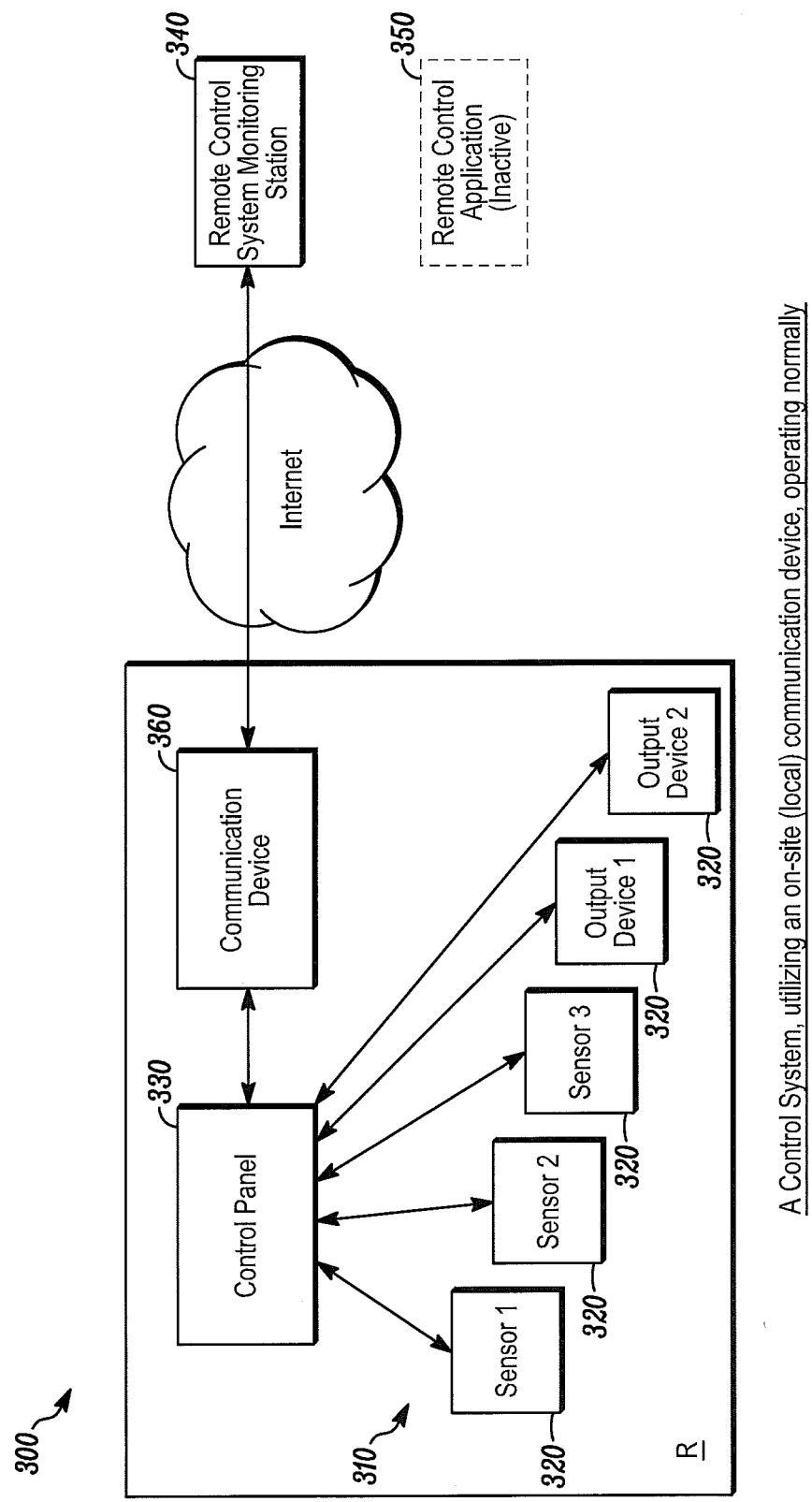
FIG. 3 is a block diagram of a system in accordance with disclosed embodiments operating normally.

FIG. 3 is a block diagram of another system 300 in accordance with disclosed embodiments. As seen in FIG. 3, the system 300 is operating normally. The system 300 can include a local control system 310 installed in a region R, and the local control system 310 can include a plurality of sensors and/or output devices 320, a control panel 330, and a communication device 360. Each of the plurality of sensors and/or output devices 320 can be in wired or wireless bidirectional communication with the control panel 330. The control panel 330 can be in wired or wireless bidirectional communication with the communication device 360, and the communication device 360 can be in wireless bidirectional communication with a remote control system monitoring station 340. For example, the communication device 360 can communicate with the remote monitoring station 340 via the Internet.

Monitoring communication messages can be transmitted between the communication device 360 and the remote monitoring station 330 at predetermined intervals to demonstrate a valid connection. In some embodiments, the monitoring communication messages between the communication device 360 and the remote monitoring station 340 can be periodic and/or include information related to the health of the control system 310. The rate at which the monitoring communication messages between the communication device 360 and the remote monitoring station 340 are transmitted can depend on communication architecture and national and international standard requirements for the control panel 330.

Figure 4:
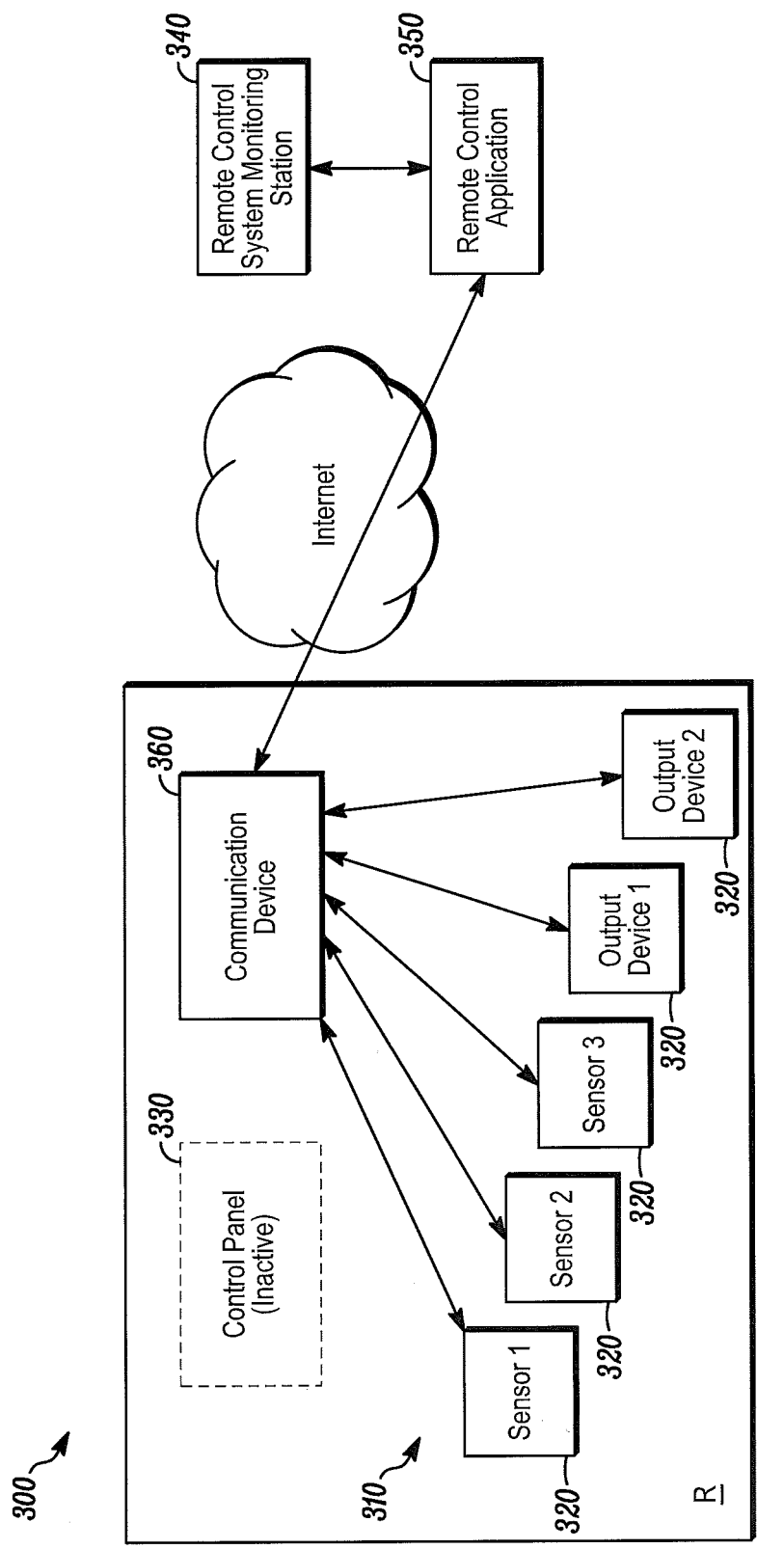
FIG. 4 is a block diagram of the system of FIG. 3 operating in a back-up mode.

As seen in FIG. 3, the system 300 can also include a remote control panel device 350. When the system is operating normally, as seen in FIG. 3, the remote control panel device 350 can be inactive. However, when software and/or hardware of the control panel 330 fails, the system 300 can operate in a back-up mode, as seen in FIG. 4.

When the system 300 is operating in a back-up mode, the control panel 330 can be inactive, and the remote control panel device 350 can be activated. The plurality of sensors and/or output devices 320 can then communicate directly with the communication device 360, which can communicate with the remote control panel device 350 rather than the remote monitoring station 340. The remote control panel device 350 can communicate with the remote monitoring station 140.

In some embodiments, when the system 300 begins operating in the back-up mode, each of the plurality of sensors and/or output devices 320 can initiate communication with the communication device 360. In other embodiments, when the system 300 begins operating in the back-up mode, the communication device 360 can initiate communication with each of the plurality of sensors and/or output devices 320.

Similarly, in some embodiments, when the system 300 begins operating in the back-up mode, the communication device 360 can initiate communication with the remote control panel device 350. These embodiments may occur when the communication device 360 is behind a firewall and thus, cannot be contacted from outside of the local control system 310 or when the communication device 360 is programmed, for security reasons, not to accept incoming connections.

In other embodiments, when the system 300 begins operating in the back-up mode, the remote control panel device 350 can initiate communication with the communication device 360 and/or any other communication devices in the control system 310. In these embodiments, the remote control panel device 350 can initiate communication with the communication device 360 when the remote control panel device 350 is notified of a system failure, that is, that the hardware and/or software of the control panel 330 has failed. For example, the remote monitoring station 340 can notify the remote control panel device 350 about a system failure, and, upon being notified, the remote control panel device 350 can activate and initiate contact with the communication device 360.

As explained above, in some embodiments, the system 300 can include more than one communication device 360, for example, a plurality of communication devices 360. In these embodiments, the plurality of sensors and/or output devices 320 can initiate communication with each of the plurality of communication devices 360. Alternatively, each of the plurality of communication devices 360 can initiate communication with each of the plurality of sensors and/or output devices 320. Regardless of the embodiment, when operating in the back-up mode, systems and methods disclosed herein can ensure that at least one communication device 360 is communicating with each of the plurality of sensors and/or output devices 320.

In some embodiments, each of the plurality of communication devices 360 can communicate with one another to determine one of the communication devices 360 to be the primary communication device 360 for the control system 310. In other embodiments, the remote control panel device 350 can communicate with each of the plurality of communication devices 360 to determine one of the communication devices 360 to be the primary communication device 360 for the control system 310. In these embodiments, the remote control panel device 350 can designate a first communication device 360 as the primary communication device 360 for the control system 310 and designate a second communication device 360 as the secondary communication device 360 for the control system 310. For example, the secondary communication device 360 can be placed in stand-by mode and become active if the primary communication device 360 fails. In some embodiments, the secondary communication device 360 can exit the stand-by mode responsive to a message from the remote control panel device 350 or after sending a message to the remote control panel device 350.

In embodiments that employ more than one communication device 360, each communication device 360 can send periodic messages to the remote control panel device 350. Accordingly, the remote control panel device 350 can ensure that all communication devices 360 are operating normally and transmit an alarm if there is a communication failure with any of the communication devices 360.

Similarly, the remote control panel device 350 can send periodic messages to each of the communication devices 360. In these embodiments, if a communication TCP session is previously established, then the communication devices 360 can receive communication from the remote control panel device 350 even if the communication devices 360 are located behind a firewall.

As explained above, the rate at which monitoring communication messages are transmitted between a communication device 360 and the remote monitoring station 340 can depend on communication architecture and national and international standard requirements for the control panel 330. For example, when a communication device 360 relies on a message from the remote control panel device 350 to become active and/or to exit a stand-by mode, communication between the communication device 360 and the remote monitoring station 340 can be more frequent, thus accounting for the latency due to the periodic communication interval.

In some embodiments, the transmission rate of monitoring communication messages can be maximized to minimize the cost for bandwidth use. In other embodiments, such as when bandwidth is unlimited or is very high, the transmission rate may be more frequent. It is to be understood that the transmission rate of monitoring communication messages can be more frequent when the system 100 or 300 is operating in the back-up mode.

According to disclosed embodiments, communication between the various components of the system 100 or 300 may or may not be encrypted. Furthermore, this communication may or may not be protected from substitution, depending on an evaluated risk and the need to comply with various national and international standard requirements for control panels. For example, communication between the control system 110, 310 and the remote control panel device 150, 350 may be subject to the requirements listed in EN 50131-3:2009 Annex C.

Figure 5:
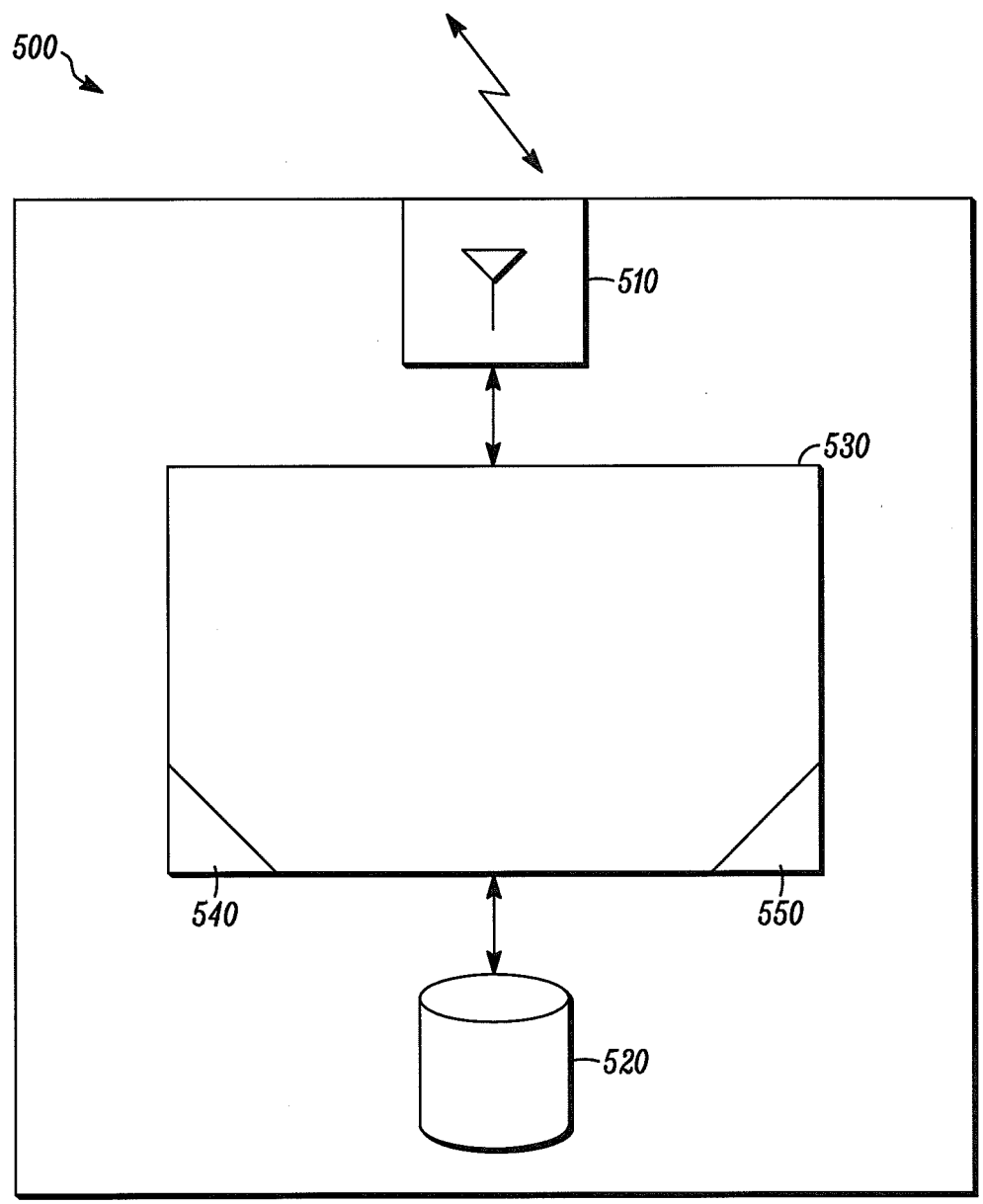
FIG. 5 is a block diagram of a remote control panel device in accordance with disclosed embodiments.

FIG. 5 is a block diagram of a remote control panel device 500 in accordance with disclosed embodiments. As seen in FIG. 5, the remote control panel device 500 can include a wireless transceiver 510, a memory device 520, control circuitry 530, one or more programmable processors 540, and executable control software 550. The executable control software 550 can be stored on a transitory or non-transitory computer readable medium, including, but not limited to, computer memory, RAM, optical storage media, magnetic storage media, flash memory, and the like.

Figure 6:
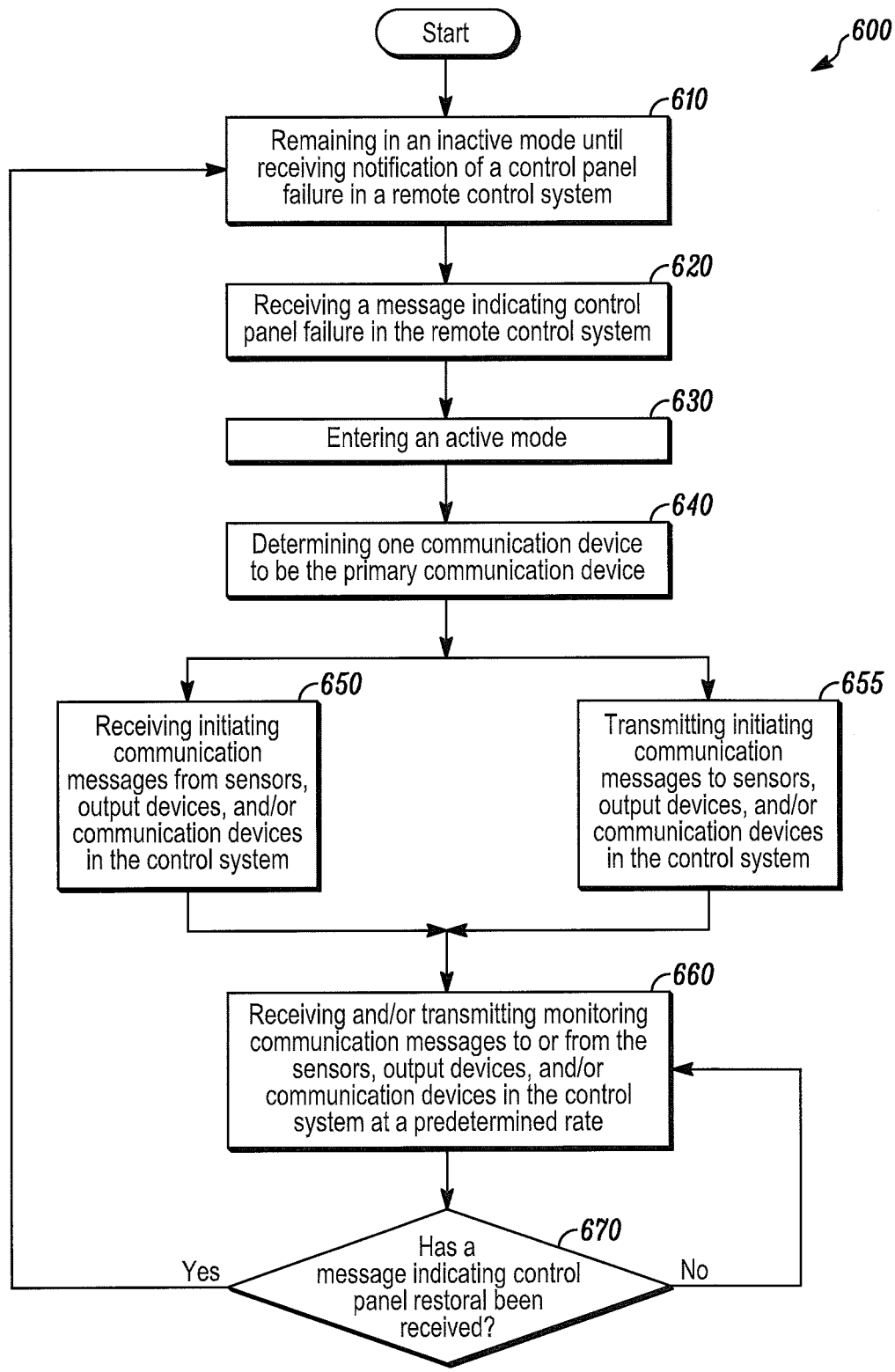
FIG. 6 is a flow diagram of a method in accordance with disclosed embodiments.

The executable control software 550 can implement the method 600 shown in FIG. 6 as well as others described herein. As seen in FIG. 6, the method 600 can include remaining in an inactive mode until receiving notification of control panel failure in a remote control system as in 610. Then, the method 600 can include receiving a message indicating control panel failure in the remote control system as in 620 and entering an active mode as in 630. For example, the method 600 can include receiving the message indicating control panel failure from a remote monitoring station or from the control system itself, for example, a sensor, output device, or communication device in the control system.

Once in the active mode, if the remote control system includes more than one communication device, then the method 600 can include determining one communication device to be the primary communication device as in 640. For example, the method 600 can include receiving a communication message from the remote control system indicating the primary communication device, or the method 600 can include transmitting a communication message to the remote control system indicating the primary communication device.

Once in the active mode, the method 600 can also include receiving initiating communication messages from sensors, output devices, and/or communication devices in the control system as in 650 or transmitting initiating communication messages to sensors, output devices, and/or communication devices in the control system as in 655. Either way, after transmission and receipt of the initiating communication messages, the method 600 can include receiving and/or transmitting monitoring communication messages to or from the sensors, output devices, and/or communication devices in the control system at a predetermined rate as in 660.

The method 600 can continue receiving and/or transmitting the monitoring communication messages as in 660 until receipt of a notification of control panel restoration in the remote control system as in 670. For example, the method 600 can include receiving a message indicating control panel restoral from a remote monitoring station or from the control system itself, for example, a sensor, output device, or communication device in the control system. When the method determines that the control panel in the remote control system has been restored as in 670, the method can again return to an inactive mode as in 610.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
   a remote control panel device receiving a message indicating control panel failure in a remote control system;
   responsive to the message indicating control panel failure in the remote control system, the remote control panel device transitioning from an inactive mode to an active mode;
   the remote control panel device determining a first communication device in a plurality of communication devices in the remote control system to be a primary communication device to primarily communicate with the remote control panel device;
   the remote control panel device determining a second communication device in the plurality of communication devices in the remote control system to be a secondary communication device to communicate with the remote control panel device when the primary communication device fails; and
   the remote control panel device remotely controlling the remote control system, absent the control panel,
   wherein the remote control panel device remotely controlling the remote control system includes the remote control panel device communicating with a sensor and an output device through the primary communication device or the secondary communication device in the remote control system, and
   wherein, when the sensor or the output device detects that the primary communication device has failed, the sensor or the output device initiates communication with the secondary communication device to activate the secondary communication device from a standby mode.

2. The method of claim 1 wherein remotely controlling the remote control system includes transmitting or receiving at least one initiating communication message to or from the remote control system.

3. The method of claim 2 wherein transmitting or receiving the at least one initiating communication message includes transmitting or receiving the at least one initiating communication message to or from the sensor, the output device, or the primary communication device in the remote control system.

4. The method of claim 1 wherein remotely controlling the remote control system includes transmitting or receiving at least one monitoring communication message to or from the remote control system.

5. The method of claim 4 wherein transmitting or receiving the at least one monitoring communication message includes transmitting or receiving the at least one monitoring communication message to or from the sensor, the output device, or the primary communication device in the remote control system.

6. The method of claim 1 further comprising:
   receiving a message indicating control panel restoral in the remote control system; and
   responsive to the message indicating control panel restoral, the remote control panel device transitioning from the active mode to the inactive mode.

7. The method of claim 1 wherein receiving the message indicating control panel failure includes receiving the message indicating control panel failure from a remote monitoring station or from the remote control system.

8. A system comprising:
   a transceiver;
   a programmable processor; and
   executable control software stored on a non-transitory computer readable medium,
   wherein, while the programmable processor and the executable control software are in an inactive mode, the transceiver receives periodic configuration messages or status messages from a control panel in a remote control system,
   wherein, responsive to the transceiver receiving a message indicating failure of the control panel in the remote control system, the programmable processor and the executable control software transition from the inactive mode to an active mode,
   wherein the programmable processor and the executable control software determine a first communication device in a plurality of communication devices in the remote control system to be a primary communication device to primarily communicate with the transceiver,
   wherein the programmable processor and the executable control software determine a second communication device in the plurality of communication devices in the remote control system to be a secondary communication device to communicate with the transceiver when the primary communication device fails,
   wherein, when in the active mode, the programmable processor and the executable control software remotely control the remote control system, absent the control panel,
   wherein the programmable processor and the executable control software remotely controlling the remote control system includes the programmable processor and the executable control software communicating with a sensor and an output device through the primary communication device or the secondary communication device in the remote control system, and
   wherein, when the sensor or the output device detects that the primary communication device has failed, the sensor or the output device initiates communication with the secondary communication device to activate the secondary communication device from a standby mode.

9. The system of claim 8, wherein the programmable processor and the executable control software remotely controlling the remote control system includes the transceiver transmitting or receiving at least one initiating communication message to or from the remote control system.

10. The system of claim 9 wherein the transceiver transmitting or receiving the at least one initiating communication message includes the transceiver transmitting or receiving the at least one initiating communication message to or from the sensor, the output device, or the primary communication device in the remote control system.

11. The system of claim 8 wherein the programmable processor and the executable control software remotely controlling the remote control system includes the transceiver transmitting or receiving at least one monitoring communication message to or from the remote control system.

12. The system of claim 11 wherein the transceiver transmitting or receiving the at least one monitoring communication message includes the transceiver transmitting or receiving the at least one monitoring communication message to or from the sensor, the output device, or the primary communication device in the remote control system.

13. The system of claim 8 wherein the transceiver receives a message indicating control panel restoral in the remote control system, and, responsive to the message indicating control panel restoral, the programmable processor and the executable control software transition from the active mode to the inactive mode.

14. The system of claim 8 wherein the transceiver receives the message indicating control panel failure from a remote monitoring station or from the remote control system.

15. The method of claim 1 wherein the plurality of communication devices includes at least one on-board PSTN communicating device and at least one GSM/GPRS communicating device.

16. The system of claim 8 wherein the plurality of communication devices includes at least one on-board PSTN communicating device and at least one GSM/GPRS communicating device.

* * * * *